Oct. 28, 1930.  B. BIGELOW  1,779,839
AUTOMATIC DRINK VENDING MACHINE
Filed Oct. 15, 1927  3 Sheets-Sheet 1

Fig. 1.

Inventor
Bryant Bigelow
by James R. Hodder
Attorney

Oct. 28, 1930.  B. BIGELOW  1,779,839
AUTOMATIC DRINK VENDING MACHINE
Filed Oct. 15, 1927  3 Sheets-Sheet 2

Inventor
Bryant Bigelow
by James R. Hodds
Attorney

Patented Oct. 28, 1930

1,779,839

UNITED STATES PATENT OFFICE

BRYANT BIGELOW, OF BOSTON, MASSACHUSETTS

AUTOMATIC DRINK-VENDING MACHINE

Application filed October 15, 1927. Serial No. 226,348.

My present invention relates to machines for dispensing or vending liquids or drinks, and more particularly to automatic machines for this purpose.

One object of the present invention is the provision of a vending machine which will dispense, into a suitable receptacle, such as a cup, a predetermined amount of liquid.

A further object is the inclusion of means which will prevent operation of the machine unless and until the proper coin has been inserted in the place provided therefor, said coin, at a predetermined position during its passage through the machine, being the means to permit operation of the liquid dispensing mechanism.

Another object is to position the receptacle or cup which is to receive the liquid, beyond the reach of the operator until such time as he has complied with the preliminary requirements for operating the machine, access to the said receptacle or cup not being possible until said cup has been completely filled.

A further object of the invention resides in the provision of means, automatically operable, after a predetermined number of drinks have been vended from the machine, to prevent the admission of further coins to the machine.

The preferred machine for carrying out the above and further objects, comprises a cabinet, in the upper portion of which is affixed a tank or liquid container. A sleeve is affixed in the lower edge of the liquid container, extending partially into the container, and from the sleeve, at the end thereof which projects outside of the container, is affixed a nozzle or spout. A valve, preferably cylindrical in shape, is slidable within said sleeve and has pivotally affixed thereto an operating lever, one end of said lever extending outside of the cabinet and terminating in a hook or handle member. The valve is of a size adapted to contain an amount of liquid sufficient to fill a desired size of cup, and has two ports therein, one permitting ingress of the liquid into the valve when the valve is in its innermost position, and the other permitting egress of the liquid through the spout and into the cup when the valve is in its outermost position.

The cup, when in position to receive the liquid, is beyond the reach of the operator, being within the cabinet, and a door being provided in the cabinet for access thereto. Means are provided, within the cabinet, and automatically operable by the operating lever, so that when the lever is in its innermost and outermost positions, the door will be unlocked, but when the lever is in transit from innermost to outermost position, viz., transferring the liquid from the container to the cup, it will be impossible to open the door. I have also provided means, operable by the door, on opening, to automatically return the locking lever, and hence the valve, to innermost or normal position, ready to receive another charge of liquid.

In order to operate my novel machine, it is first necessary to insert a coin of predetermined denomination, into a slot provided therefor in the front of the cabinet. This coin then centers and travels through a coin slot or mechanism of well-known construction, and comes to rest in a groove or slot in a position to be moved forward by the operating lever. If the coin is not in position, and the operator endeavors to pull the operating lever forwardly, means is provided to engage a lug on the said lever, effectually preventing its forward movement, and thus eliminating possibility of tampering with the mechanism. With the coin in position, and movement being transmitted to the operating lever, the coin, in its forward travel, will permit the locking mechanism to become inoperative, thus permitting complete forward movement of the lever. Means are also provided to engage the lever in its forward movement, and prevent return movement thereof until it has reached its outermost position, in which position it is held until the door is open, opening of the door automatically returning the lever and valve to normal position, the lever being under spring tension when moved from normal position.

I also provide means, controlled by the door, to prevent manipulation of the operating lever unless the door is closed, opening of the door while the lever is in its innermost position, effectually locking the said lever against outward movement.

In order to prevent operation of the machine after a predetermined number of drinks have been vended, I provide means, operated by the coin when moved forward by the operating lever, to actuate shutter mechanism, which mechanism, at a predetermined instant, will cause a shutter to close the coin slot, preventing the admission of further coins until the container has been refilled, and the shutter has been removed from the coin slot.

Movement of the operating lever forwardly, also, will manipulate a cup dispensing mechanism, I preferably utilizing cup dispensing mechanism of a well-known type, automatically positioning a cup under the nozzle or spout, in position to receive the charge of liquid from the valve.

I consider that my machine, as above described, is novel, and I have therefore claimed the same broadly herein.

Further objects of the invention, details of construction, combinations of parts, advantages and operation, will be hereinafter more fully described and claimed.

Referring to the drawings, illustrating a preferred embodiment of the present invention.

Figure 3:
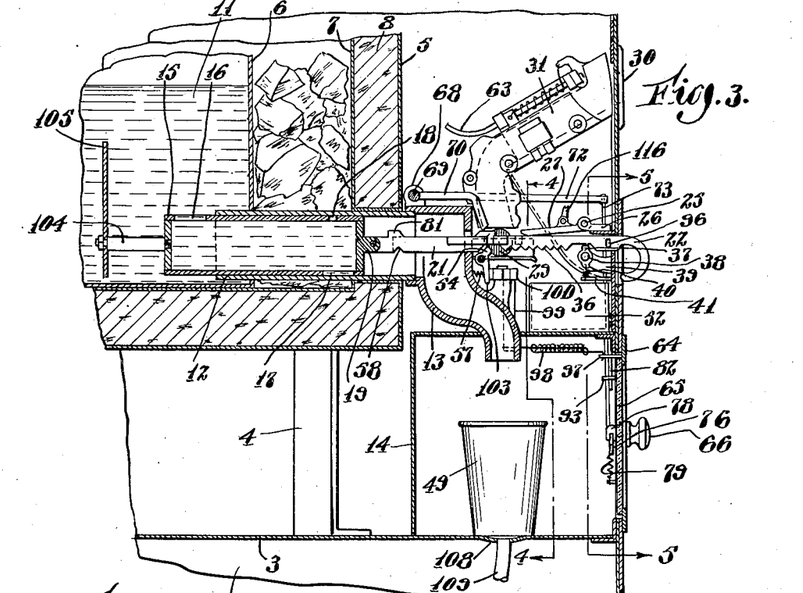
Fig. 3 is a cross-sectional view on the line 3—3 of Fig. 2.
Figure 4:
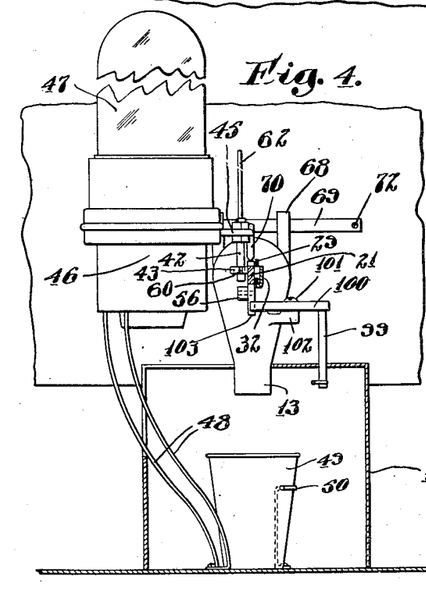
Fig. 4 is a cross-sectional view on the line 4—4 of Fig. 3.

As shown in the drawings, my present novel machine comprises a cabinet 1 mounted on legs or supports 2 and divided into an upper and lower compartment by a floor or lateral web 3. Supported on a plurality of brackets 4, in the upper compartment, is a receptacle 5, comprising a liquid container or tank 6, ice compartment 7, and insulating sheathing 8 of cork or the like. If desired, instead of ice in the compartment 7, any desired cooling device, such as a refrigerating coil, may be utilized. A cover 9 is provided for the entire receptacle 5, and a cover 10 for the container 6. The liquid adapted to be dispensed or vended by the machine is indicated at 11 in the container 6. Extending completely through the receptacle 5, and projecting partially into the container 6, and also extending partially outside of the receptacle 5, is a sleeve 12, and affixed to the outer end of the sleeve 12 is a nozzle or outlet spout 13, said spout projecting downwardly into a chamber 14. Slidable within the sleeve 12 is a valve 15, provided with ports 16 and 17. This valve is preferably cylindrical in shape and has a liquid capacity equivalent to the cup or receptacle to be filled. When the valve 15 is in its innermost position, or as illustrated in Fig. 3, the port 16 is exposed to the liquid 11, permitting the valve to be filled, an air escape and inlet port 18 being provided, to facilitate the filling and emptying of the valve. When in the position shown in Fig. 3, the port 17 is covered by the sleeve 12.

On the front of the valve 15 is a lug 19 and pivotally connected thereto, as at 20, is the operating lever 21, this operating lever extending through the front of the cabinet and terminating in a hook or handle portion 22.

My machine is adapted as an automatic vending machine, and in order to prevent manipulation of the operating lever 21, except when the proper coin has been deposited in the machine, I provide, on the top of the lever 21, a lug 23 having a flat front face 24. Pivotally mounted at 25 to a yoked plate 26, is a plate 27 having a portion of its end flat, as at 28. This plate 27 rests on top of the lever 21, in the path of the lug 23, and, on drawing the handle 22 forwardly, the face 24 of the lug 23 will engage the face 28 of the plate 27, effectually preventing further forward movement of the lever or valve, this stopping action taking place before the port 17 has entered or become alined with the discharge nozzle 13.

In order to actuate the device to dispense a drink therefrom, it is necessary to insert a coin 29 of proper denomination, in the slot 30, said coin passing through a coin feed mechanism 31 of usual and well-known construction, which need not be described in detail. After passing through the coin mechanism 31, the coin 29 comes to rest in a race or slot 32, being held in position against the lever 21 thereby, and being held against movement by the lugs 33 and 34. Now, when the handle 22 is pulled forwardly, the lever and valve will also be moved forwardly, until the liquid contained within the valve is dispensed through the outlet nozzle 13.

As the lever 21 is drawn forwardly, the curved edge of the coin 29 will engage the slanting or beveled edge 35 of the forward part of the plate 27, raising the plate 27 and permitting the lug 23 to pass thereunder, the plate 27 being of a sufficient width to span both the coin 29 and lug 23. As the lever 21 is moved forwardly, also, the ratchet 36 will engage a two-way pawl 37 pivotally mounted at 38 on an arm 39, and normally held in upand-down position by a spring 40, secured, one end to the pawl 37 and the other end to a pin 41. The engagement of the ratchet 36 with the pawl 37, will prevent return of the lever to normal innermost position until the ratchet will have passed completely by the pawl 37, at which time the entire charge of liquid in the valve 15 will have been discharged through the nozzle 13.

During the forward passage of the lever 21, a rod 42, normally held between the lugs 43 and 44, will also be moved forwardly, this rod 42 being connected to the lever 45 for operating the cup-dispensing mechanism illustrated generally at 46. This cup dispensing mechanism is of standard and well-known construction, and need not be described in detail herein. The cups are contained within the glass portion 47, as is usual, and movement of the lever 45 will detach one cup, such as 49, from the stack, permitting it to drop along the chute 48, coming to rest against a shield 50, in which position it will be retained directly under the outlet nozzle 13.

It will be appreciated that before the lever 21 has completed its forward travel, the coin 29 will slide from the groove 32, over the curved nose 51 and will be deposited in the coin box 52 provided therefor. As the lever 21 travels forwardly, also, the inclined face 53 will engage and depress a pawl 54, pivoted at 55 on a lug 56 on the nozzle 13, against the tension of the spring 57, until the notch 58 in the lever 21 engages the pawl 54, when the spring 57 will force the pawl upwardly into the notch 58, thus positively holding the lever 21 against return movement.

As the lever 21 is pulled forwardly, it moves against the tension of the spring 59 fitting in a notch 60 in the lug 43, said spring 59 being secured to the inside front of the cabinet 1 at 61.

Secured to the lever 45 is an upstanding rod 62 which, when the lever 45 is moved forwardly, will engage the curved rod 63 of the coin mechanism, opening same to eject any slugs, paper wads, or the like which are held therein.

Figures 6, 7, 8:
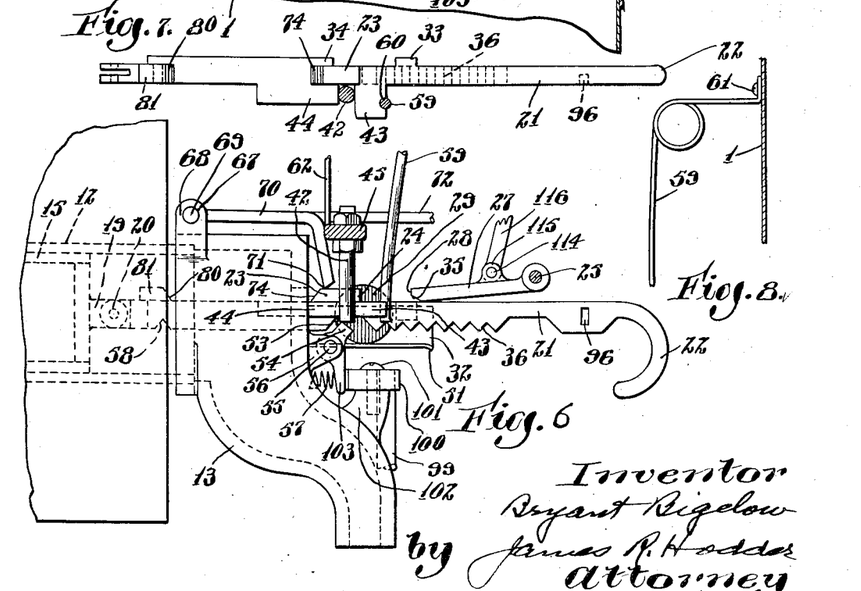
Fig. 6 is a view, on an enlarged scale, of the operating lever in position for manipulation.
Fig. 7 is a plan view of the operating lever.
Fig. 8 is a detail view of the operating lever retracting spring.

The cup 49 now being filled with the liquid or drink, and positioned in the chamber 14, it becomes necessary to open the door 64 for access thereto. A pane of glass 65 or other transparent material is provided in the door so that the operator can view the process of filling the cup and can determine when the nozzle 13 has stopped discharging the liquid. A handle 66 is provided for manipulating the door. I consider it essential that the door shall be positively locked, except when the lever 21 is in its two extreme positions, viz., innermost or outermost, and for this purpose have devised novel mechanism as follows: pivoted at 67 in bosses 68 on the nozzle 13, is a shaft 69. Affixed to this shaft 69 is a rod 70, bent downwardly and terminating in a point at 71. To one end of the shaft 69 is affixed a rod 72 extending forwardly to a point adjacent to the front of the cabinet, and depending from the rod 72 is a rod 73. When the lever 21 is in innermost position, as shown in Fig. 6, the point 71 of the rod 70 will have ridden up on the inclined face 74 of the lug 23, raising the rod 70, and hence rotating the shaft 69 and raising the rods 72 and 73. Raising of the rod 73 will have raised the end 75 of a latch 76 which is pivoted at 77, freeing said latch from the hook or catch 78, and permitting the door to be pulled open. This raising of the end 75 of the latch 76 is against the tension of a coiled spring 79 which will assist in the locking action when the rod 70 is released from the lug 23 during travel of the lever 21, by pulling the rod 73 downwardly. When the lever is being pulled outwardly, the latch 76 will be in engagement with the hook 78, preventing opening of the door until the cup filling operation is completed, at which time the inclined face 80 of the lug 81 will have engaged the point 71 of the rod 70, causing the same to ride up onto the lug 81, and again freeing the latch 76 from the catch 78.

Figure 5:
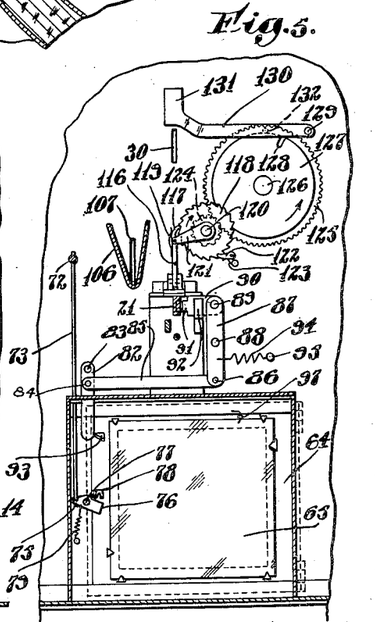
Fig. 5 is a cross-sectional view on the line 5—5 of Fig. 3.

In the event that an operator should have deposited a coin in the machine, and should open the door before pulling the lever, I have devised novel means to lock the lever until the door is again closed, in order that the machine shall be completely closed during the dispensing operation. To accomplish this desirable result I provide an arm 82 pivoted to the front of the cabinet at 83 and pivotally connected at 84 to a link 85, which link is in turn pivotally connected at 86 to a link 87 pivoted intermediate its ends at 88. Pivoted at 89 to the link 87 is a short arm 90 having a projecting tongue 91, and resting in a guide bracket 92. When the door is closed, as shown in Figs. 3 and 5, a cam 93 will engage the arm 82, and move the same to the left as shown in Fig. 5, against the tension of a coiled spring 94 secured to the cabinet at 95 and also to the link 87. On opening of the door, however, before the lever 21 has been moved, the coiled spring 94 will pull the link 87 to the right, Fig. 5, on its pivot, moving the arm 90 to the left, Fig. 5, and causing the tongue 91 to be inserted in a recess 96 in the operating lever 21, thus preventing forward movement of the lever until the door has been closed and the cam 93 is engaged by the arm 82, and through the movement above described has released the tongue 91 from the recess 96.

When the lever is in its outermost position, and the cup filling operation has been completed, opening of the door will cause a pulling of the pin 97, secured to the door. This pin 97 is connected, through a spring arrangement 98, to a rod 99, swingable through a slot 113, which rod 99 in turn is secured to a lever 100 pivoted at 101 to a boss 102 on the nozzle 13. Thus the opening of the door will cause the swinging of the lever 100 on its pivot, and cause the free end of the lever 100 to engage the lower end 103 of the pawl 54, forcing same out of the notch 58 and permitting the spring 59 to retract the operating lever and valve, for the purpose of filling the valve with another charge of liquid. The lever 100 is normally held away from the end 103 of the pawl 54 by a spring 136 affixed to a pin 137 on the side of the nozzle 13.

As the lever is retracted, the lug 43, being of greater length than the lug 44, will positively assure engagement of the lug 43 with the rod 42 of the cup dispensing mechanism, returning this rod to its original position, and placing the cup dispensing mechanism in condition to dispense another cup on recurrence of the forward movement of the lever 21. To prevent too-fast return of the valve and lever to normal position, I affix, to a shaft 104 secured to the inner end of the valve, a vane 105, which vane will serve a dual function. First, it will retard the return of the valve, acting as a brake, and secondly, it will agitate the liquid 11 within the container 6, thus insuring that the liquid will be maintained in proper condition for dispensing.

When in retracted position, the device is again locked until insertion of the proper coin into the slot 30. Any improper coin, slug, or the like, will be ejected from the coin mechanism 31 and returned out of the machine through a chute 106 and slot 107, provided for this express purpose.

The floor of the cup chamber 14 is depressed at the center, as at 108 and a drain 109 leads from the depressed portion to a suitable receptacle 110 in the lower portion of the cabinet. In the front of the cabinet, and leading to a basket or receptacle 111 in the said lower portion, is a trough or chute 112, for the reception of used cups.

The tank or container 6 is filled with a predetermined amount of liquid, sufficient for a predetermined number of drinks, and in order to prevent operation of the machine after the tank 6 has been emptied, and before refilling, I have devised a novel arrangement, as follows: pivoted on a pin 114 in bosses 115 on the plate 27, is a shaft 116, extending upwardly and having a pivoted pawl 117 on its upper end, this pawl engaging a ratchet wheel 118 and being held thereagainst by a spring 119. The ratchet wheel 118 is mounted on a shaft 120, and mounted on the same shaft is an arm 121, pivotally secured, at its outer end, to the shaft 116, and which retains the shaft 116 and pawl 117 in proper relationship with the ratchet wheel 118. A locking pawl 122 is held against the ratchet wheel 118 by a spring 123, to prevent backward movement of the ratchet wheel during operation thereof by the pawl 117. Mounted on the shaft 120 is a pinion 124 engaging a gear wheel 125 mounted on a shaft 126. Also mounted on the shaft 126, and closely adjacent to the gear 125, is a plate 127 having a notch or recess 128 therein. Pivotally mounted at 129 is an arm 130 carrying a shutter 131, and also carried by the arm 130 is a pin 132, riding on the edge of the plate 127 until the notch 128 reaches a predetermined position, at which time the pin 132 will drop into the notch 128, dropping the arm 130 and bringing the shutter 131 over the coin slot 30, preventing the entrance of further coins to the machine until the tank 6 has been refilled and the shutter raised. The gear 125, as illustrated herein for conventional purposes only, is in the ratio of five to one with the pinion 124. In other words, the pinion 124 will make five revolutions to one revolution of the gear wheel 125, after which complete revolution of the gear wheel the tank 6 will be emptied, and the pin 132 will drop into the notch 128, preventing further operation. A sufficient quantity of liquid over that required to fill the predetermined number of cups is, of course, provided, to take care of drip, leakage, etc.

Figure 1:
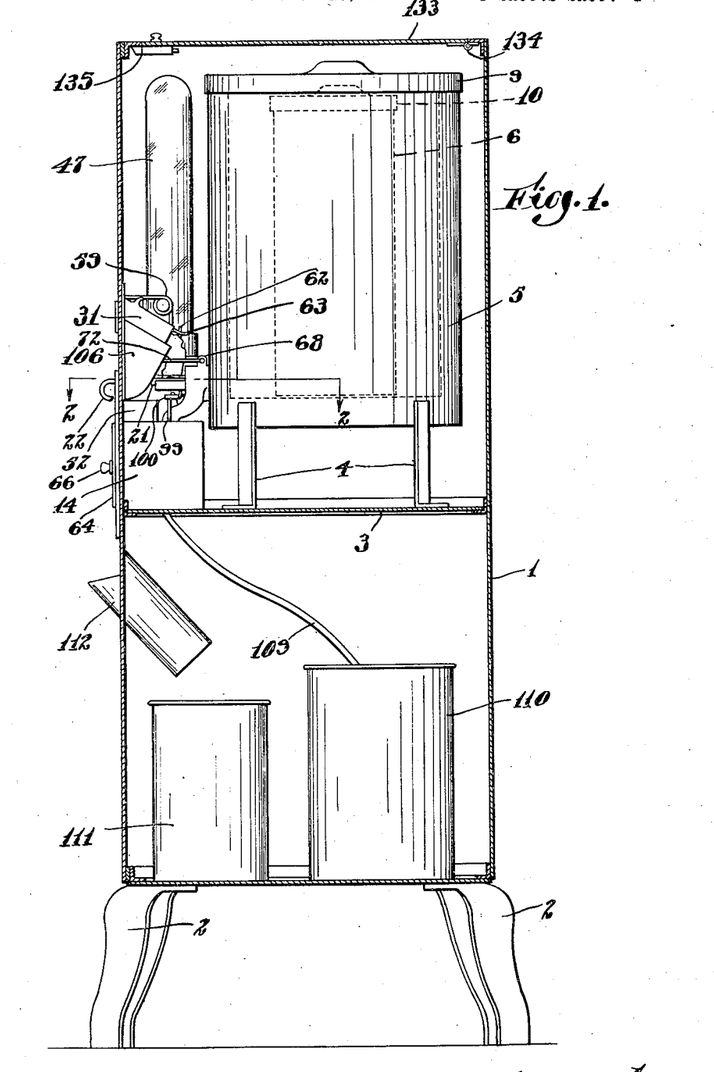
Fig. 1 is a vertical sectional view of the complete machine.
Figure 2:
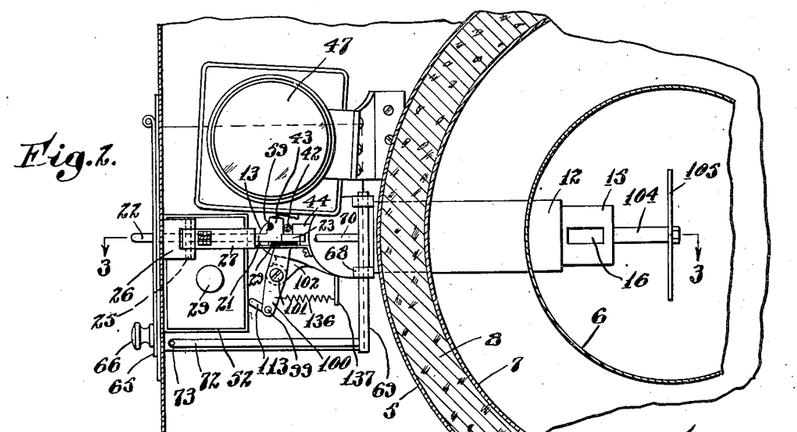
Fig. 2 is a cross-sectional view on the line 2—2 of Fig. 1.

Access to the tank 6, ice compartment 7, and the interior of the machine, is had through the cover 133, which is hinged at 134 and has catches 135, as shown in Fig. 1.

Locks are provided, both for the hinged top 133, and for the entire front of the compartment, to prevent unlawful tampering with the interior of the machine, these locks being of any desired or usual construction and not, therefore, being shown herein in the present case.

It will thus be seen that I have devised an entirely novel machine of this type, one which is simple to operate, positive in its action, and efficient to a high degree.

I belive that the machine, as a whole, and many of the parts thereof, are novel, and I have therefore claimed the same broadly herein.

While I have necessarily described my invention somewhat in detail, it will be appreciated that I may vary the size, shape, and arrangement of parts within reasonably wide limits without departing from the spirit of the invention.

My invention is further described and defined in the form of claims as follows:

1. In a machine of the kind described, a cabinet, a source of liquid supply in said cabinet, a discharge nozzle remote from said supply, a hollow valve of predetermined capacity movable between said supply and said nozzle, said valve having inlet and discharge ports therein, a lever connected to said valve and extending through one wall of said cabinet, cup dispensing mechanism, means actuated by said lever during its forward movement to dispense a cup, means to position said cup under said nozzle, a door in one side of said cabinet, means to lock said lever in extended position during the discharge of the liquid from said valve, and means operated by said door to unlock said lever.

2. In a machine of the kind described, a cabinet, a source of liquid supply in said cabinet, a discharge nozzle remote from said supply, a hollow valve of predetermined capacity movable between said supply and said nozzle, said valve having inlet and discharge ports therein, a lever connected to said valve and extending through one wall of said cabinet, cup dispensing mechanism, means actuated by said lever during its forward movement to dispense a cup, means to position said cup under said nozzle, a door in one side of said cabinet, means to lock said lever in extended position during the discharge of the liquid from said valve, means operated by said door to unlock said lever, and means to automatically return said lever and valve to normal position.

3. In a machine of the kind described, a cabinet, a source of liquid supply in said cabinet, a discharge nozzle remote from said supply, a hollow valve of predetermined capacity movable between said supply and said nozzle, said valve having inlet and discharge ports therein, a lever connected to said valve and extending through one wall of said cabinet, a door in one side of said cabinet, means to lock said lever in extended position during the discharge of the liquid from said valve, and means operated by said door to unlock said lever.

4. In a machine of the kind described, a cabinet, a source of liquid supply in said cabinet, a discharge nozzle remote from said supply, a hollow valve of predetermined capacity movable between said supply and said nozzle, said valve having inlet and discharge ports therein, a lever connected to said valve and extending through one wall of said cabinet, cup dispensing mechanism, means actuated by said lever during its forward movement to dispense a cup, means to position said cup under said nozzle, a door in one side of said cabinet, means controlled by said lever to lock said door during travel of said lever, and means controlled by said door to prevent manipulation of said lever when said door is open.

5. In a machine of the kind described, a cabinet, a source of liquid supply in said cabinet, a discharge nozzle remote from said supply, a hollow valve of predetermined capacity movable between said supply and said nozzle, said valve having inlet and discharge ports therein, a lever connected to said valve and extending through one wall of said cabinet, cup dispensing mechanism, means actuated by said lever during its forward movement to dispense a cup, means to position said cup under said nozzle, a door in one side of said cabinet, means controlled by said lever to lock said door during travel of said lever, and spring actuated means controlled by said door to prevent manipulation of said lever when said door is open.

6. In a machine of the kind described, a cabinet, a source of liquid supply in said cabinet, a discharge nozzle remote from said supply, a hollow valve of predetermined capacity movable between said supply and said nozzle, said valve having inlet and discharge ports therein, a lever connected to said valve and extending through one wall of said cabinet, cup dispensing mechanism, means actuated by said lever during its forward movement to dispense a cup, means to position said cup under said nozzle, a door in one side of said cabinet, means to lock said lever in extended position during the discharge of the liquid from said valve, means operated by said door to unlock said lever, and spring means to return said lever and valve to normal position.

7. In a machine of the kind described, a cabinet, a source of liquid supply in said cabinet, a discharge nozzle remote from said supply, a hollow valve of predetermined capacity movable between said supply and said nozzle, said valve having inlet and discharge ports therein, a lever connected to said valve and extending through one wall of said cabinet, cup dispensing mechanism, means actuated by said lever during its forward movement to dispense a cup, means to position said cup under said nozzle, a door in one side of said cabinet, means controlled by said lever to lock said door during travel of said lever, spring actuated means controlled by said door to prevent manipulation of said lever when said door is open, and means on said lever to return said cup dispensing mechanism to normal position.

8. In a machine of the kind described, a cabinet, a source of liquid supply in said cabinet, a discharge nozzle remote from said supply, a hollow valve of predetermined capacity movable between said supply and said nozzle, said valve having inlet and discharge ports therein, a lever connected to said valve and extending through one wall of said cabinet, cup dispensing mechanism, means actuated by said lever during its forward movement to dispense a cup, means to position said cup under said nozzle, a door in one side of said cabinet, means to lock said lever in extended position during the discharge of the liquid from said valve, means operated by said door to unlock said lever, means controlled by said lever to lock said door during travel of said lever, spring actuated means controlled by said door to prevent manipulation of said lever when said door is open, and means on said lever to return said cup dispensing mechanism to normal position.

9. In a machine of the kind described, a cabinet, a source of liquid supply in said cabinet, a discharge nozzle remote from said supply, a hollow valve of predetermined capacity movable between said supply and said nozzle, said valve having inlet and discharge ports therein, a lever connected to said valve and extending through one wall of said cabinet, cup dispensing mechanism, means actuated by said lever during its forward movement to dispense a cup, means to position said cup under said nozzle, means to prevent return of said valve to filling position until its movement to discharging position shall have been completed, a door in one side of said cabinet, means to lock said lever in extended position during the discharge of the liquid from said valve, means operated by said door to unlock said lever, means controlled by said lever to lock said door during travel of said lever, spring actuated means controlled by said door to prevent manipulation of said lever when said door is open.

10. In a machine of the kind described, a cabinet, a source of liquid supply in said cabinet, a discharge nozzle remote from said supply, a hollow valve of predetermined capacity movable between said supply and said nozzle, said valve having inlet and discharge ports therein, a lever connected to said valve and extending through one wall of said cabinet, cup dispensing mechanism, means actuated by said lever during its forward movement to dispense a cup, means to position said cup under said nozzle, means to prevent return of said lever to normal position until its forward movement shall have been completed, a door in one side of said cabinet, means to lock said lever in extended position during the discharge of the liquid from said valve, means operated by said door to unlock said lever, and spring means to return said lever and valve to normal position.

11. In a machine of the kind described, a cabinet, a source of liquid supply in said cabinet, a discharge nozzle, a valve interposed between said supply and said nozzle, a lever attached to said valve and extending through one wall of said cabinet, a door adjacent to said nozzle, and means to retain said lever in extended position until said door is opened.

12. In a machine of the kind described, a cabinet, a source of liquid supply in said cabinet, a discharge nozzle, a valve interposed between said supply and said nozzle, a lever attached to said valve and extending through one wall of said cabinet, means to compel complete travel of said lever to extended position before its return to normal position, a door adjacent to said nozzle, and means to retain said lever in extended position until said door is opened.

13. In a machine of the kind described, a cabinet, a source of liquid supply in said cabinet, a discharge nozzle, a valve interposed between said supply and said nozzle, a lever attached to said valve and extending through one wall of said cabinet, a door adjacent to said nozzle, and means operable on opening of said door to return said lever to normal position.

14. In a machine of the kind described, a cabinet, a source of liquid supply in said cabinet, a discharge nozzle, a valve interposed between said supply and said nozzle, a lever attached to said valve and extending through one wall of said cabinet, a door adjacent to said nozzle, means to retain said lever in extended position until said door is opened, and means operable on opening of said door to return said lever to normal position.

15. In a machine of the kind described, a cabinet, a source of liquid supply in said cabinet, a discharge nozzle, a valve interposed between said supply and said nozzle, a lever attached to said valve and extending through one wall of said cabinet, means to compel complete travel of said lever to extended position before its return to normal position, a door adjacent to said nozzle, and means operable on opening of said door to return said lever to normal position.

16. In a machine of the kind described, a cabinet, a source of liquid supply in said cabinet, a discharge nozzle, a valve interposed between said supply and said nozzle, a lever attached to said valve and extending through one wall of said cabinet, means to compel complete travel of said lever to extended position before its return to normal position, a door adjacent to said nozzle, means to retain said lever in extended position until said door is opened, and means operable on opening of said door to return said lever to normal position.

17. In a machine of the kind described, a cabinet, a source of liquid supply in said cabinet, a discharge nozzle, a valve interposed between said supply and said nozzle, a lever attached to said valve and extending through one wall of said cabinet, a door adjacent to said nozzle, means to lock said door during travel of said lever, and means to retain said lever in extended position until said door is opened.

18. In a machine of the kind described, a cabinet, a source of liquid supply in said cabinet, a discharge nozzle, a valve interposed between said supply and said nozzle, a lever attached to said valve and extending through one wall of said cabinet, a door adjacent to said nozzle, means to lock said door during travel of said lever, and means to compel complete travel of said lever to extended position before its return to normal position.

19. In a machine of the kind described, a cabinet, a source of liquid supply in said cabinet, a discharge nozzle, a valve interposed between said supply and said nozzle, a lever attached to said valve and extending through one wall of said cabinet, a door adjacent to said nozzle, means to lock said door during travel of said lever, means to compel complete travel of said lever to extended position before its return to normal position, and means to retain said lever in extended position until said door is opened.

20. In a machine of the kind described, a cabinet, a source of liquid supply in said cabinet, a discharge nozzle, a valve interposed between said supply and said nozzle, a lever attached to said valve and extending through one wall of said cabinet, a door adjacent to said nozzle, means to lock said door during travel of said lever, and means operable on opening of said door to return said lever to normal position.

21. In a machine of the kind described, a cabinet, a source of liquid supply in said cabinet, a discharge nozzle, a valve interposed between said supply and said nozzle, a lever attached to said valve and extending through one wall of said cabinet, a door adjacent to said nozzle, means to lock said door during travel of said lever, means to compel complete travel of said lever to extended position before its return to normal position, and means operable on opening of said door to return said lever to normal position.

22. In a machine of the kind described, a cabinet, a source of liquid supply in said cabinet, a discharge nozzle, a valve interposed between said supply and said nozzle, a lever attached to said valve and extending through one wall of said cabinet, a door adjacent to said nozzle, means to lock said door during travel of said lever, means to retain said lever in extended position until said door is opened, and means operable on opening of said door to return said lever to normal position.

23. In a machine of the kind described, a cabinet, a source of liquid supply in said cabinet, a discharge nozzle, a valve interposed between said supply and said nozzle, a lever attached to said valve and extending through one wall of said cabinet, a door adjacent to said nozzle, means to lock said door during travel of said lever, means to compel complete travel of said lever to extended position before its return to normal position, means to retain said lever in extended position until said door is opened, and means operable on opening of said door to return said lever to normal position.

24. In a machine of the kind described, a cabinet, a source of liquid supply in said cabinet, a discharge nozzle, a valve interposed between said supply and said nozzle, a lever attached to said valve and extending through one wall of said cabinet, cup dispensing mechanism operable by said lever in its travel to discharge a cup adjacent to said nozzle, a door adjacent to said nozzle, and means to retain said lever in extended position until said door is opened.

25. In a machine of the kind described, a cabinet, a source of liquid supply in said cabinet, a discharge nozzle, a valve interposed between said supply and said nozzle, a lever attached to said valve and extending through one wall of said cabinet, cup dispensing mechanism operable by said lever in its travel to discharge a cup adjacent to said nozzle, a door adjacent to said nozzle, and means operable on opening of said door to return said lever to normal position.

26. In a machine of the kind described, a cabinet, a source of liquid supply in said cabinet, a discharge nozzle, a valve interposed between said supply and said nozzle, a lever attached to said valve and extending through one wall of said cabinet, cup dispensing mechanism operable by said lever in its travel to discharge a cup adjacent to said nozzle, a door adjacent to said nozzle, means to retain said lever in extended position until said door is opened, and means operable on opening of said door to return said lever to normal position.

27. In a machine of the kind described, a cabinet, a source of liquid supply in said cabinet, a discharge nozzle, a valve interposed between said supply and said nozzle, a lever attached to said valve and extending through one wall of said cabinet, cup dispensing mechanism operable by said lever in its travel to discharge a cup adjacent to said nozzle, means to compel complete travel of said lever to extended position before its return to normal position, a door adjacent to said nozzle, and means operable on opening of said door to return said lever to normal position.

28. In a machine of the kind described, a cabinet, a source of liquid supply in said cabinet, a discharge nozzle, a valve interposed between said supply and said nozzle, a lever attached to said valve and extending through one wall of said cabinet, cup dispensing mechanism operable by said lever in its travel to discharge a cup adjacent to said nozzle, means to compel complete travel of said lever to extended position before its return to normal position, a door adjacent to said nozzle, means to retain said lever in extended position until said door is opened, and means operable on opening of said door to return said lever to normal position.

29. In a machine of the kind described, a cabinet, a source of liquid supply in said cabinet, a discharge nozzle, a valve interposed between said supply and said nozzle, a lever attached to said valve and extending through one wall of said cabinet, cup dispensing mechanism operable by said lever in its travel to discharge a cup adjacent to said nozzle, means to compel complete travel of said lever to extended position before its return to normal position, a door adjacent to said nozzle, means to lock said door during travel of said lever, means to retain said lever in extended position until said door is opened, and means operable on opening of said door to return said lever to normal position.

30. In a machine of the kind described, a cabinet, a source of liquid supply in said cabinet, a discharge nozzle, a valve interposed between said supply and said nozzle, a lever attached to said valve and extending through one wall of said cabinet, a door adjacent to said nozzle, and means automatically operable on opening of said door to return said lever to normal position.

In testimony whereof, I have signed my name to this specification.

BRYANT BIGELOW.